(12) United States Patent
Hueter et al.

(10) Patent No.: US 10,664,889 B2
(45) Date of Patent: May 26, 2020

(54) SYSTEM AND METHOD FOR COMBINING AND OPTIMIZING BUSINESS STRATEGIES

(75) Inventors: Geoffrey J. Hueter, San Diego, CA (US); Steven C. Quandt, Encinitas, CA (US); Christopher J. Bryant, Solana Beach, CA (US)

(73) Assignee: Certona Corporation, San Diego, CA (US)

( * ) Notice: Subject to any disclaimer, the term of this patent is extended or adjusted under 35 U.S.C. 154(b) by 1016 days.

(21) Appl. No.: 12/416,083

(22) Filed: Mar. 31, 2009

(65) Prior Publication Data
US 2009/0248495 A1    Oct. 1, 2009

Related U.S. Application Data
(60) Provisional application No. 61/041,447, filed on Apr. 1, 2008.

(51) Int. Cl.
*G06Q 30/06* (2012.01)
*G06N 20/00* (2019.01)
(Continued)

(52) U.S. Cl.
CPC ......... *G06Q 30/0631* (2013.01); *G06N 20/00* (2019.01); *G06Q 10/00* (2013.01);
(Continued)

(58) Field of Classification Search
CPC ........... G06Q 30/0631; G06Q 30/0204; G06Q 30/00; G06Q 30/0185; G06Q 30/0201;
(Continued)

(56) References Cited

U.S. PATENT DOCUMENTS 6,134,532 A * 10/2000 Lazarus et al. ............ 705/14.25
6,356,879 B2 * 3/2002 Aggarwal et al. ......... 705/26.62
(Continued)

OTHER PUBLICATIONS

Cho et al., A personalized recommender system based on web usage mining and decision tree induction, Expert Systems with Applications 23 (2002) 329-342.*
(Continued)

*Primary Examiner* — Timothy Padot
*Assistant Examiner* — Darlene Garcia-Guerra
(74) *Attorney, Agent, or Firm* — Knobbe Martens Olson & Bear, LLP (57) ABSTRACT

A system and method for tracking subject behavior and making object recommendations include a data collection module that captures subject behavior and provides behavioral context for the recommendations; a profiling module that extracts characteristics of subjects and objects from the behavior data; and a recommendation module, which uses the profiles and the behavior context to generate personalized content and which includes a behavioral recommendation module, correlating profiles or uses other unconstrained methods for matching objects to subjects; a business rule module filtering and modifying recommendations by applying application-specific business logic to defined attributes of the objects; and a promotion module modifying the scores from the recommendation module to bias the recommendations towards certain objects based on additional business goals. The system continuously samples and assesses the performance of a variety of candidate recommendation strategies and optimizes the selection of rules and profiling methods.

19 Claims, 8 Drawing Sheets

(51) Int. Cl.
    *G06Q 30/02*   (2012.01)
    *G06Q 30/00*   (2012.01)
    *H04L 12/58*   (2006.01)
    *G06Q 10/00*   (2012.01)

(52) U.S. Cl.
    CPC ......... *G06Q 30/00* (2013.01); *G06Q 30/0185* (2013.01); *G06Q 30/0201* (2013.01); *G06Q 30/0202* (2013.01); *G06Q 30/0204* (2013.01); *G06Q 30/0255* (2013.01); *G06Q 30/0269* (2013.01); *H04L 51/12* (2013.01)

(58) Field of Classification Search
    CPC ........... G06Q 30/0202; G06Q 30/0255; G06Q 30/0269; G06Q 10/00; G06N 20/00; H04L 51/12
    USPC ...................................... 705/26.7, 7.11, 7.12
    See application file for complete search history.

(56) References Cited

U.S. PATENT DOCUMENTS

| | | | |
|---|---|---|---|
| 7,734,641 B2* | 6/2010 | Kanigsberg et al. | 707/765 |
| 7,921,042 B2* | 4/2011 | Jacobi et al. | 705/26.7 |
| 7,979,322 B2* | 7/2011 | Stoppelman | 705/26.7 |
| 2002/0161664 A1* | 10/2002 | Shaya et al. | 705/26 |
| 2003/0018517 A1* | 1/2003 | Dull et al. | 705/10 |
| 2003/0040850 A1* | 2/2003 | Najmi et al. | 701/1 |
| 2003/0093338 A1* | 5/2003 | Kim et al. | 705/27 |
| 2003/0208754 A1* | 11/2003 | Sridhar et al. | 725/34 |
| 2004/0117290 A1* | 6/2004 | Shacham | 705/37 |
| 2004/0133480 A1* | 7/2004 | Domes | 705/26 |
| 2004/0260574 A1* | 12/2004 | Gross | 705/1 |
| 2005/0015376 A1* | 1/2005 | Fraser et al. | 707/10 |
| 2006/0229932 A1* | 10/2006 | Zollo et al. | 705/10 |
| 2007/0005437 A1* | 1/2007 | Stoppelman | 705/26 |
| 2007/0094066 A1* | 4/2007 | Kumar et al. | 705/10 |
| 2008/0065471 A1* | 3/2008 | Reynolds et al. | 705/10 |
| 2008/0154761 A1* | 6/2008 | Flake et al. | 705/37 |
| 2008/0159634 A1* | 7/2008 | Sharma et al. | 382/224 |
| 2008/0162377 A1* | 7/2008 | Pinkas | 705/36 R |
| 2008/0162574 A1* | 7/2008 | Gilbert | 707/104.1 |
| 2008/0183794 A1* | 7/2008 | Georgis et al. | 709/201 |
| 2008/0208786 A1* | 8/2008 | Serrano-Morales et al. | 706/47 |
| 2008/0209320 A1* | 8/2008 | Mawhinney et al. | 715/700 |
| 2008/0256060 A1* | 10/2008 | Chang et al. | 707/5 |
| 2008/0294584 A1* | 11/2008 | Herz | 706/46 |
| 2009/0018996 A1* | 1/2009 | Hunt et al. | 707/2 |
| 2009/0132459 A1* | 5/2009 | Hicks | 706/52 |
| 2010/0268661 A1* | 10/2010 | Levy | G06Q 30/02 705/347 |

OTHER PUBLICATIONS

Strategic Online Advertising: Modeling Internet User Behavior with Advertising.com, Johnston et al., Published in: 2006 IEEE Systems and Information Engineering Design Symposium, pp. 162-167 (Year: 2006).*

* cited by examiner

SYSTEM AND METHOD FOR COMBINING AND OPTIMIZING BUSINESS STRATEGIES

FIELD OF THE INVENTION

The present invention relates to electronically marketing goods, services, content, and other entities by combining the automated analysis of human behavior with business promotions and merchandising rules. The system has application to Internet retailing, behavioral targeting, recommendation systems, personalization, business rules, and business optimization.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects aid not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects. The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
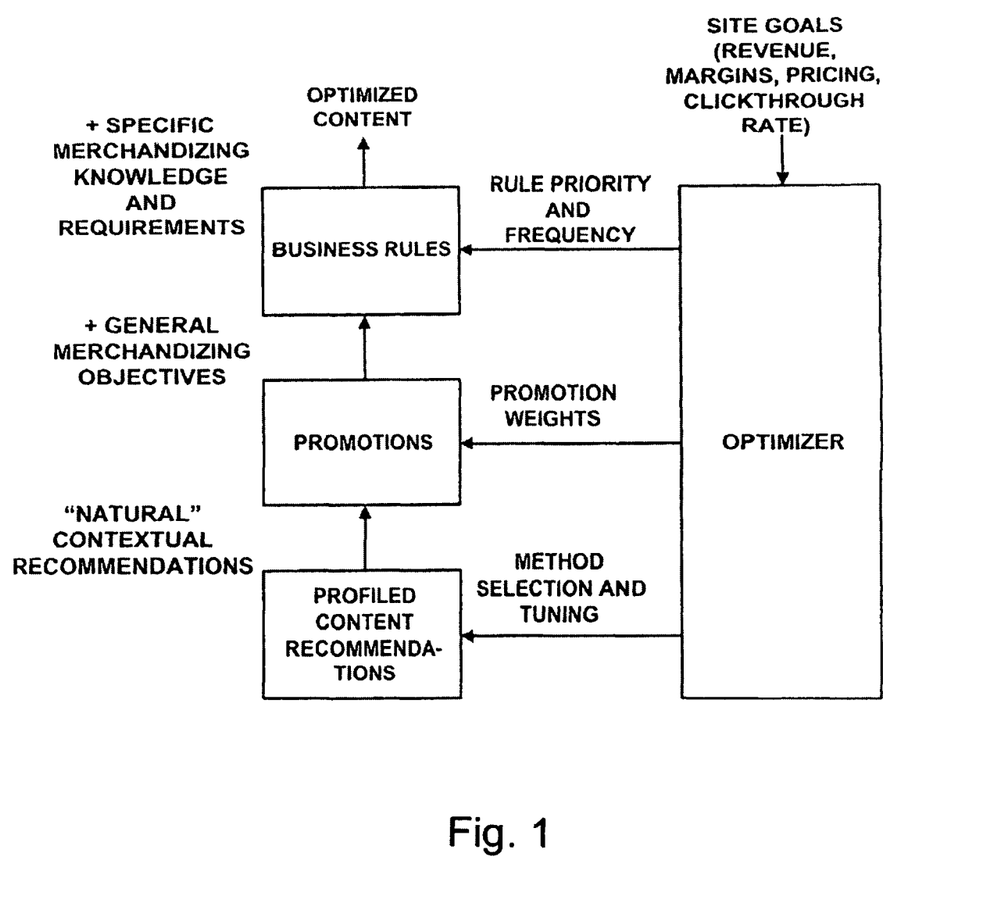
FIG. 1 shows the system configuration for combining profile-based recommendations with other business restrictions and objectives.

The following detailed description is related to the technology disclosed in U.S. patent application Ser. No. 12/415,758 filed on Mar. 31, 2009 and U.S. patent application Ser. No. 12/416,005 filed on Mar. 31, 2009, and both are incorporated by reference herein, in its entirety. FIG. 1 shows the system configuration for combining profile-based recommendations with other business restrictions and objectives. In many cases, it is desirable to modify the results of the predicted affinities of the profiling engine in order to achieve other goals beyond the conversion defined by the target model or where there may be constraints on what content can be associated with certain other content. This is handled via the recommendation stack shown in the figure. As described in U.S. patent application Ser. No. 12/415,758 filed on Mar. 31, 2009 and U.S. patent application Ser. No. 12/416,005 filed on Mar. 31, 2009, the profiling engine generates "natural" recommendations by matching the subject vector to the object vectors and generating a ranked list of predicted affinities or scores. Depending on the configuration of the scheme and the extent to which the subject has been profiled, the system may alternatively generate recommendations by matching an object vector for a currently viewed object to other object vectors. The promotions module then biases the recommendation scores from the profiling engine according to pre-defined rules that are designed to meet other business objectives, such as sales margins, inventory availability, seasonal changes, new products, featured products, or sales closeouts. The score biases are typically smaller in magnitude than the profiling engine scores, so that the recommendations will be biased towards the highest promotion score when content items are fairly close in profiling score, that is all other things being roughly equal, but will not force on the subject an item that is expected to be much less desirable to that subject than another item.

Finally, the results of adding the profiling and promotion scores are filtered according to the business rules. The business rules embody merchandizing knowledge of the business or desired use of the recommendation box, or scheme, such as whether targeted content should be kept within the same segment, for example category, subcategory, genre, or author, whether some content cannot be recommended against other content, for example a brand or same category exclusion, or whether products should be forced to be higher or lower in price on a certain page of the website, for example restricting recommendations to lower-priced items on the shopping cart or restricting recommendations to higher-priced items on a product detail page. Once the scored and ranked list of targeted content is filtered by the business rules, the final output can then be rendered to the client application for interaction by the user. Although the promotions module and the business rules can be driven by the same metadata, for example to bias recommendations towards higher sales margin products as opposed to restricting to products that exceed some minimum margin, the promotion biases can be considered a "soft" filter, whereby less promoted products are less likely but still possible to be recommended, whereas the business rules can be considered a "hard" filter, whereby only products meeting the business rule are allowed regardless of any other affinity of the user to the content.

Note that this recommendation stack adds another dimension to the content targeting—whereas the natural profiling recommendations reflect the overriding strategy of the site as defined by the target model, such as product purchase, content page view, ad clickthrough, or e-mail response, the promotions and business rules provide tactical capabilities to the website's merchandisers. These tactical factors are often quite significant, because the site may be continuously changing due to seasonal or holiday turnover, fashion changes, new model years, sales, or other changes that trigger behavior changes in the website's visitors. Another key attribute of the recommendation stack is that the impact of each layer can be specifically measured and adjusted to optimize the combined goals of the site. Within the profiling engine, this includes selection of which method has the highest conversion for that scheme. For the promotions module, the adjustments would be to determine the proper scale for the promotion scores. For the business rules, this could include adjusting the parameters of the business rules, for example setting the optimum minimum price point for a product upsell on a product detail page of an online retail website.

In addition to various business rules and promotions, the recommendation stack also supports multiple recommendation methods. This includes factoring subject object affinities and object object similarities, which are derived from weighted object object co-occurrences, and using the resulting vector-based affinity and similarity recommendation methods as described previously in U.S. patent application Ser. No. 12/415,758 filed on Mar. 31, 2009 and U.S. patent application Ser. No. 12/416,005 filed on Mar. 31, 2009, but may also include other methods. One alternative method, which is called the weighted similarity direct (WSD) method, is to use the similarities directly to make recommendations of one object against another object. This differs from the vector-based method in that it cannot make predictions against substitute products, which would have similar object vectors; that is, the WSD method is restricted to those cases where the objects are observed together in historical data, whereas the vector method infers relationships through intermediary objects, which may be separated widely in time and organizational category. Nonetheless, the WSD method has the advantage of operational efficiency because it does not require the factorization process. Another key feature of the WSD method is that it subsumes other methods that can be used in recommender systems. This includes co-purchased recommendations, whereby the set of co-occurrences used in the similarity calculations are restricted to the target event, such as being purchased together. Similarly, the WSD method can be used to generate co-browsed recommendations by limiting the events used in the similarity calculations to those at the browsing level of the target model, that is, prior to purchase or other target conversion. Similarly, the WSD method can be restricted to events of different types, such as restricting the antecedent event object browsing and the consequent event to object conversion, such as to create a recommendation of which products were purchased after browsing a given product. Also, the objects associated by the WSD method do not have to be of the same type, so that the system can recommend, for example, the products most purchased or content most viewed after the visitor performs a particular search of the application's catalog or content. In cases where there is not a subject or object context, other alternative methods of recommendation that can be included in the recommendation stack include most popular/most browsed, best sellers by total dollars, and best sellers by unit volume.

Figure 2:
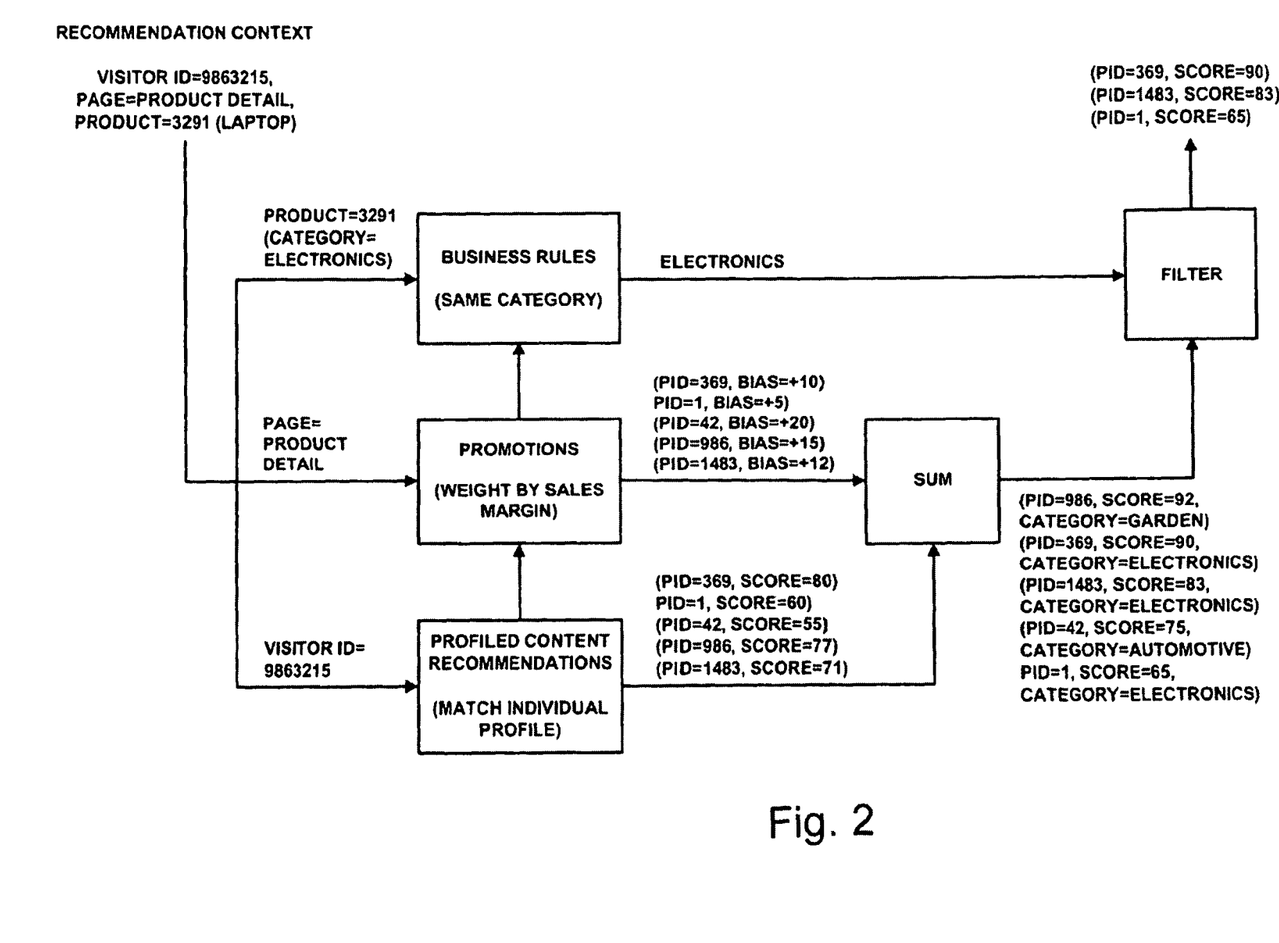
FIG. 2 shows an example of the processing output for the recommendation and business rule stack.

FIG. 2 shows an example of the processing output for the recommendation and business rule stack. This example represents a general merchandiser that sells a variety of different types of products and that wants to target the visitor with the products that are most likely to convert, that is be purchased, subject to the secondary goal of maximizing profitability, in terms of sales margins, and limiting the products offered to be in the same category that the visitor is currently browsing. In this example the recommendation scores are scaled to a range of 0 to 100. The system first takes the visitor's profile and finds the best matching products across the entire catalog, regardless of margin or category. Next, a bias is added to each item's score proportional to the margin of the product. Finally, the system filters out any products that are not in the electronics category and returns the final recommendation list.

Figure 3:
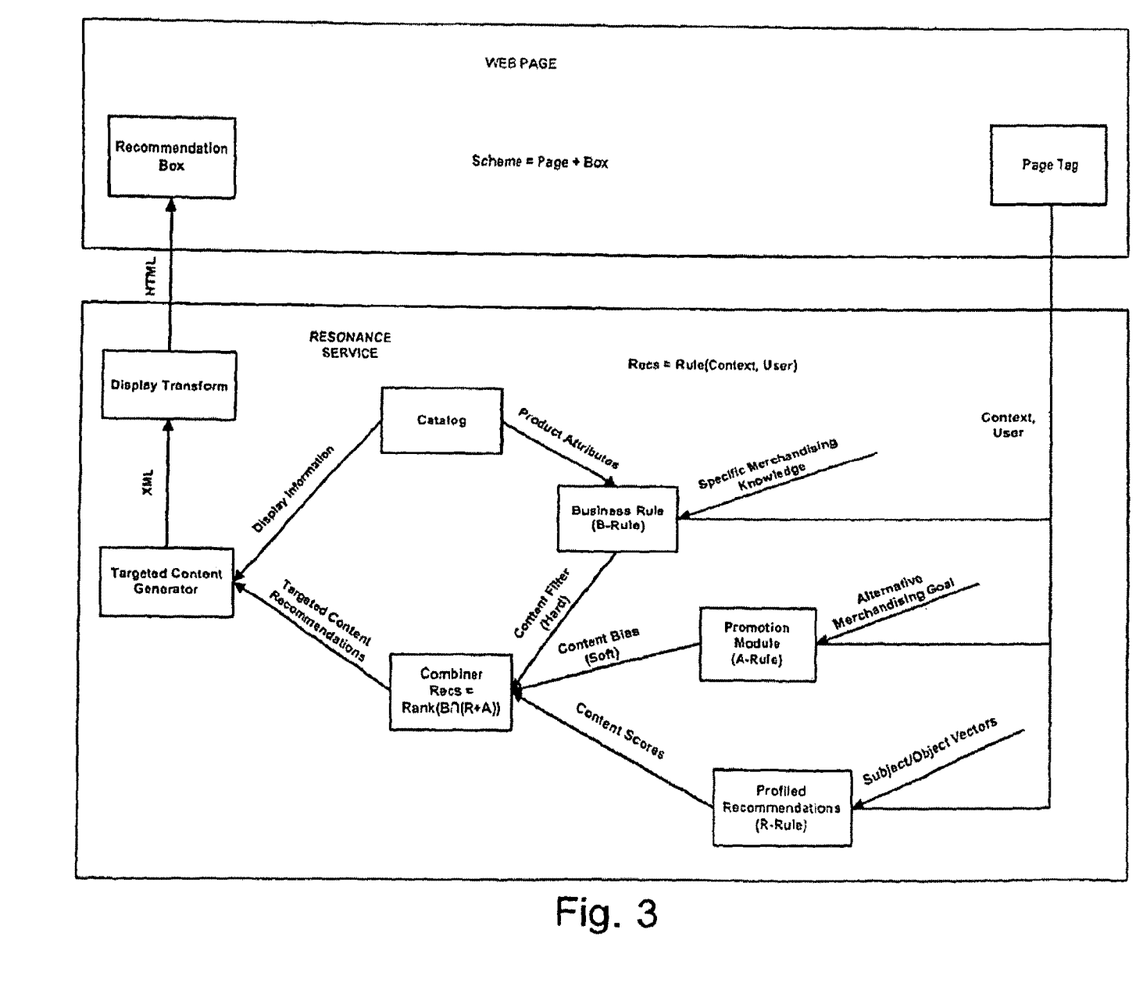
FIG. 3 shows the operation of the system to generate content for a single website location.

FIG. 3 shows the operation of the system to generate content for a single website location. The targeted content for each page location, or scheme, is determined by the user and the page context, such as type of page, including site level and category, and item identifier, including product identifier, content identifier and/or search keywords. The context is captured from the client browser by the page tag (Java Script) and submitted to the Resonance service. The user and item identifier are used as the generators for the profiled recommendations. The profiled recommendations can be generated through a variety of mechanisms depending on how much is known about the user and/or item, if applicable, including fully profiled methods such as subject-object matching or object-object matching, for example keyword-content or product-product, down to best sellers or other less targeted methods that can be applied when the user is unprofiled and an object context does not exist. The context, such as type of page, determines whether and how much of a bias to apply to the profiled recommendation results. Finally, the business rules encapsulate the specific merchandising knowledge of the application experts. This may be applied to the scheme context, such as in the case of category of content or brand restriction, or to the user, for example age, gender, location, or income restriction. The biases are added to the recommendation scores, filtered by the business rules, and then ranked to produce the recommended content list. The content identifiers are used to retrieve the display information from the catalog, which also provides the metadata to parse the business rules. The resulting recommendation content, which is coded in XML format, is then passed through a display transformation, which converts the raw XML format into display HTML, which is then sent to the client browser and displayed. In an alternate embodiment the recommendations can be rendered by the application web server, in which case the XML is returned to the application server and the display transformation is generated and applied by the application server.

Figure 4:
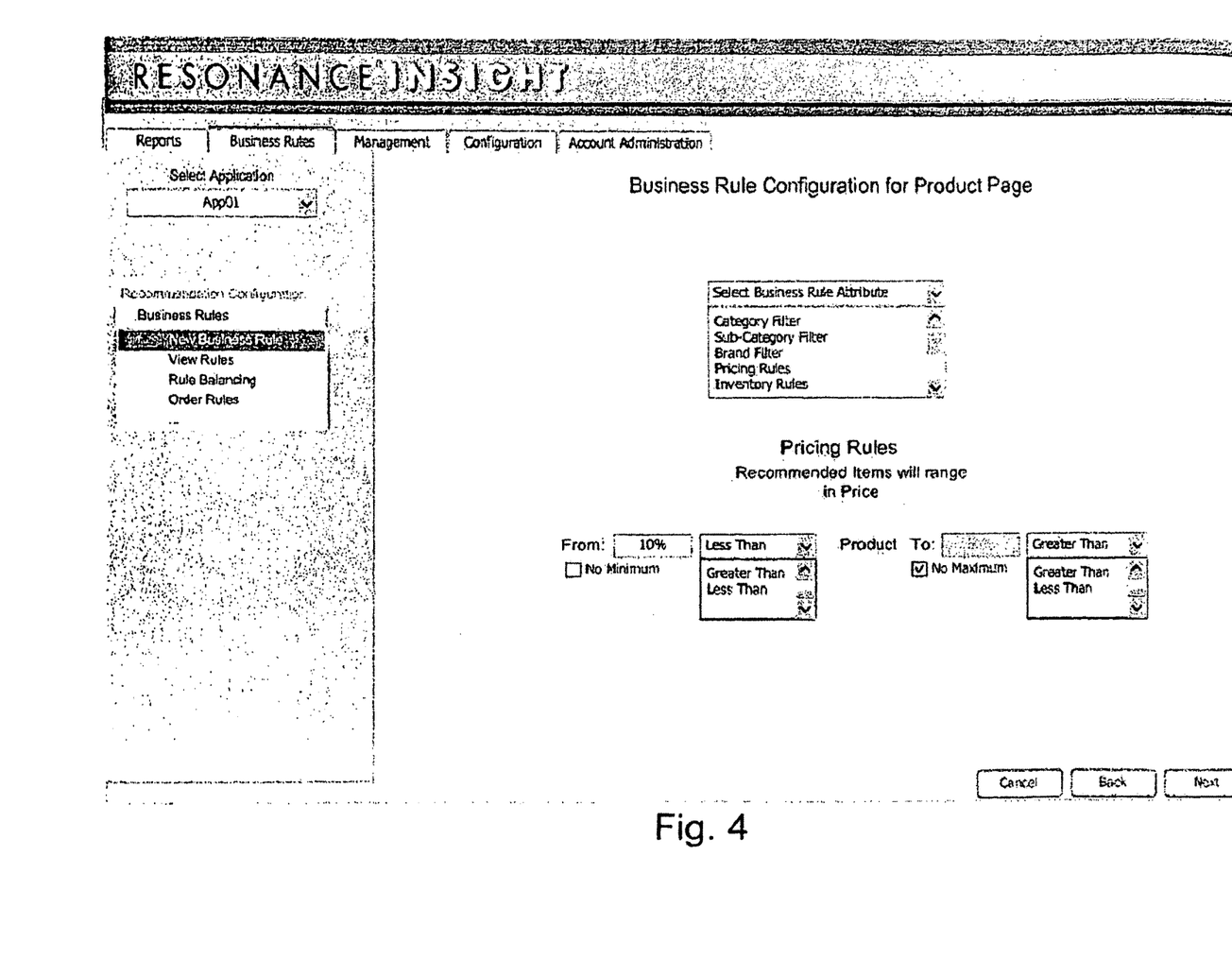
FIG. 4 shows a user interface to configure a business rule.

FIG. 4 shows a user interface to configure a business rule. Business rules are based on attributes, or metadata, that are defined in the application content catalog. Alternatively, business may be based on attributes of the application users (subjects). To configure a business rule, the business user first selects the scheme to configure. The scheme to be configured is selected from a pre-configured master list for the website. Next, the user selects the attribute on which the rule will be based. Then, the user sets an attribute value or range of values to accept. These may be absolute or relative to the item context of the website, such as in the case of matching the category or brand of the currently displayed product. Item attributes may be categorical or continuous. For categorical, or discrete, attributes each item is associated with one or more of a finite number of options. For continuous attributes each item is associated with an ordered numeric value. Examples of object categorical attributes are category, subcategory, and brand. Examples of subject categorical attributes are gender, country of residence, and profession. Examples of object continuous attributes are age of inventory, time since date of introduction of item to the catalog, number of items remaining, price, and sales margin. Examples of subject continuous attributes are age, income, and total value of past purchases.

Figure 5:
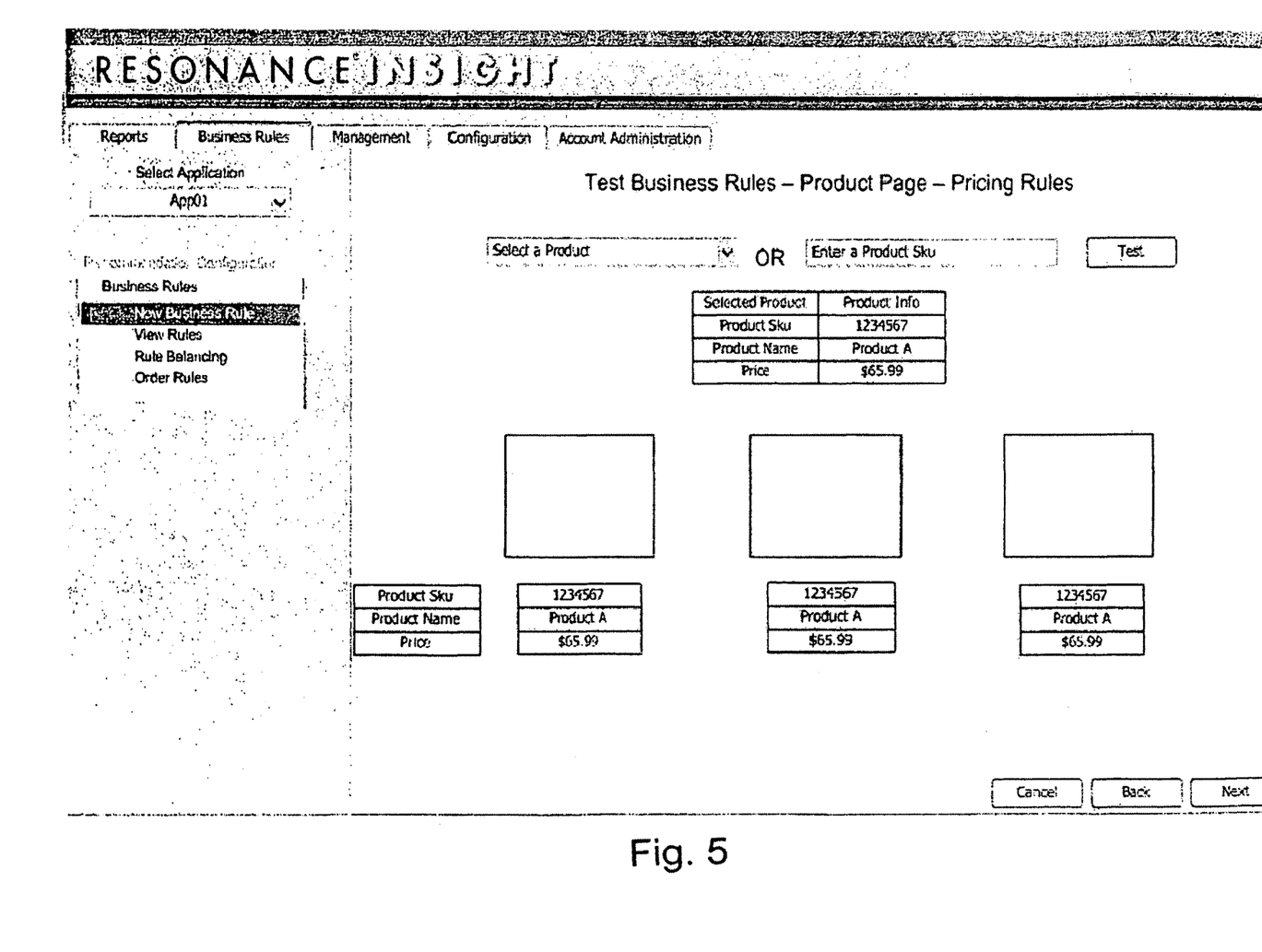
FIG. 5 shows a user interface to test a business rule.

FIG. 5 shows a user interface to test a business rule. To test a rule, the user first selects the item, or object, and visitor, or subject, context. The system applies the rule to the items in the catalog and returns the top matching items that would be recommended for that context and selected scheme. This allows the user to validate that the business rule is working properly and to make adjustments, if needed. This feature also allows the user to preview the visual display of the recommended content after the results are fed through the display transformation. Once the testing is complete, the business rule can be rolled out to the live website.

Figure 6:
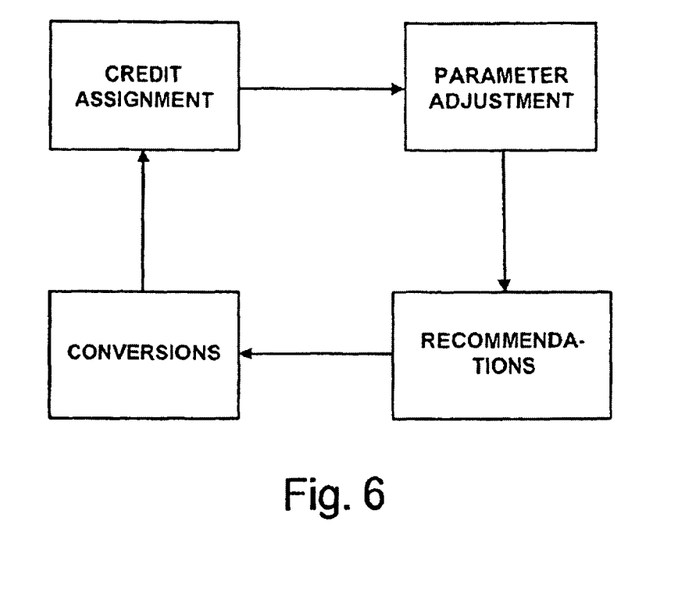
FIG. 6 shows the operation of the system to manage parameter pools and sample and optimize parameters according to business goals.

FIG. 6 shows the operation of the system to manage parameter pools and sample and optimize parameters according to business goals. Parameters may include score thresholds for recommendation methods, business rule range values for continuous attributes, scaling factors for recommendation methods promotions and lookback periods for including historical information in the recommendation method models. The strategy comparison and optimization process is as follows: First, the system generates recommended content and presents it to the application's subjects. The subjects respond in various degrees to the targeted content, with some subjects achieving the target goal, or conversion, as defined by the target model. Since the system may be generating content for multiple schemes and simultaneously testing multiple rule, promotion, and method strategies on each scheme, the credit assignment module determines which scheme and strategy to credit with each converted item. Based on the comparative performance of each strategy, the strategy parameters and relative presentation rates are updated for subsequent recommendations. This process continues iteratively until the system achieves optimum performance. If the conditions of the application change, such as due to a holiday, change in catalog, or seasonal variations, then this process will re-optimize the recommendations to track the change in conditions.

Figure 7:
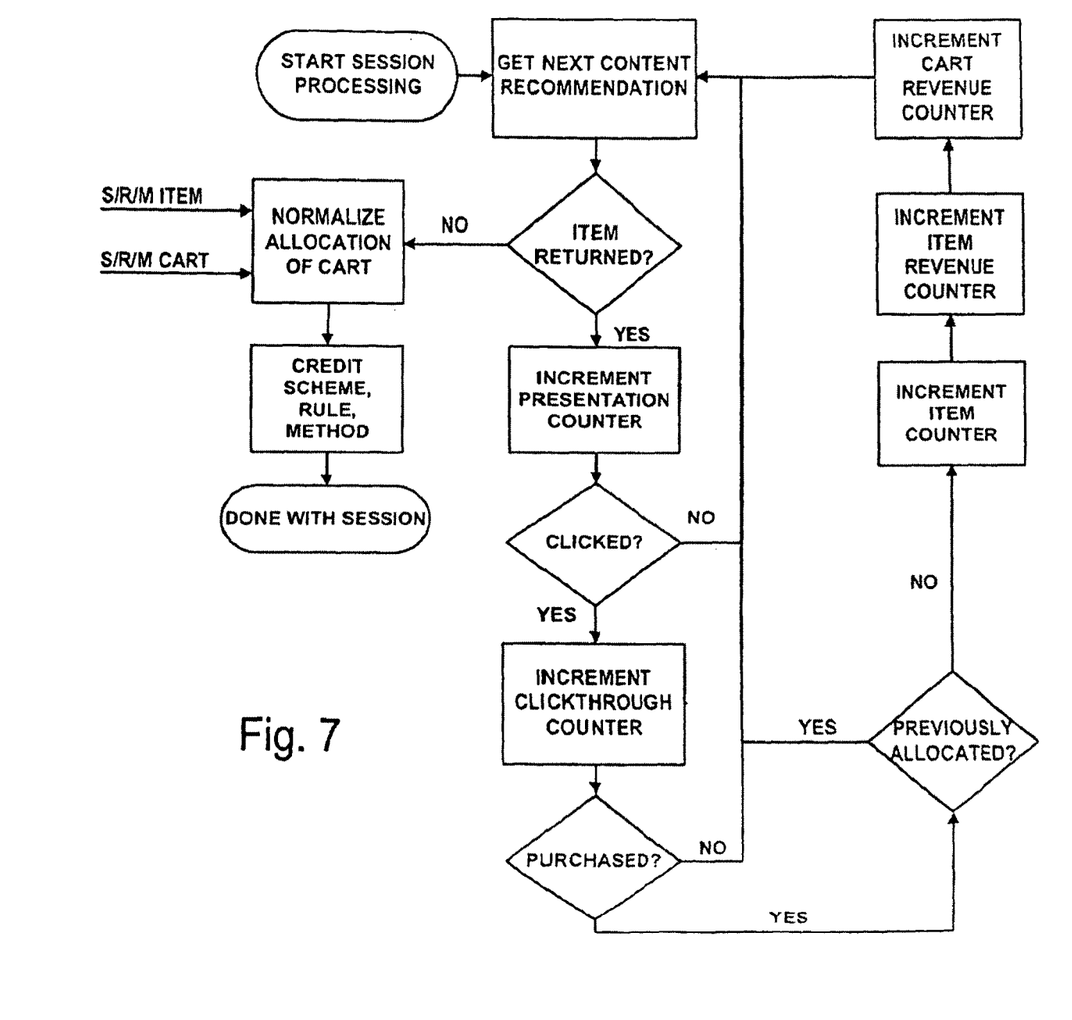
FIG. 7 shows the operation of the system to track individual recommendations and assign credit for reaching the target goal.

FIG. 7 shows the operation of the system to track individual recommendations and assign credit for reaching the target goal. Each recommendation presentation, clickthrough, and resulting outcome is tracked to the specific scheme (S), business rule (R), and recommendation method (M) that generated the recommendation. The credit assignment is processed on a session-by-session basis. Within the session the recommendation and conversion, or target, events are time-ordered. Each recommendation is processed in order of occurrence, that is earliest first, as follows: First, the presentation counter is incremented for the scheme, rule, and method (S/R/M) that generated the recommendation. If the recommendation is not clicked, then processing proceeds to the next recommendation. If the recommendation is clicked, then the S/R/M clickthrough counter is incremented. If the clicked item is not subsequently converted, however defined by the application, such as the item being purchased, then processing proceeds to the next recommendation. In the preferred embodiment credit is assigned on a first recommendation basis, so that if the clicked item is converted and the conversion has already been allocated to an earlier event, then the subsequent repeated recommendation is not given credit and processing continues to the next recommendation. Alternatively, credit could be given to the last clicked converted recommendation. In either case, when a recommendation is credited with a conversion, the system increments the S/R/M converted item counter, the S/R/M item revenue counter, which in this example is the revenue associated with the specific recommended item, and the S/R/M cart revenue counter, which in this example is the revenue associated with the entire cart containing the recommended item. Once all recommendations have been processed, then if more than one recommended item appears in the cart, the cart revenue is split between the different S/R/Ms in proportion to the item revenue counters. For example, if SRM1 contributed $45 in revenue and SRM2 contributed $55 in item revenue and the total cart revenue was $200, then SRM1 would be credited with 55% of the cart, or $110, and SRM2 would be credited with 45% of the cart, or $90. Note that while the example shows tracking of a purchase as the target event, this credit assignment process can be applied to any type of conversion.

Figure 8:
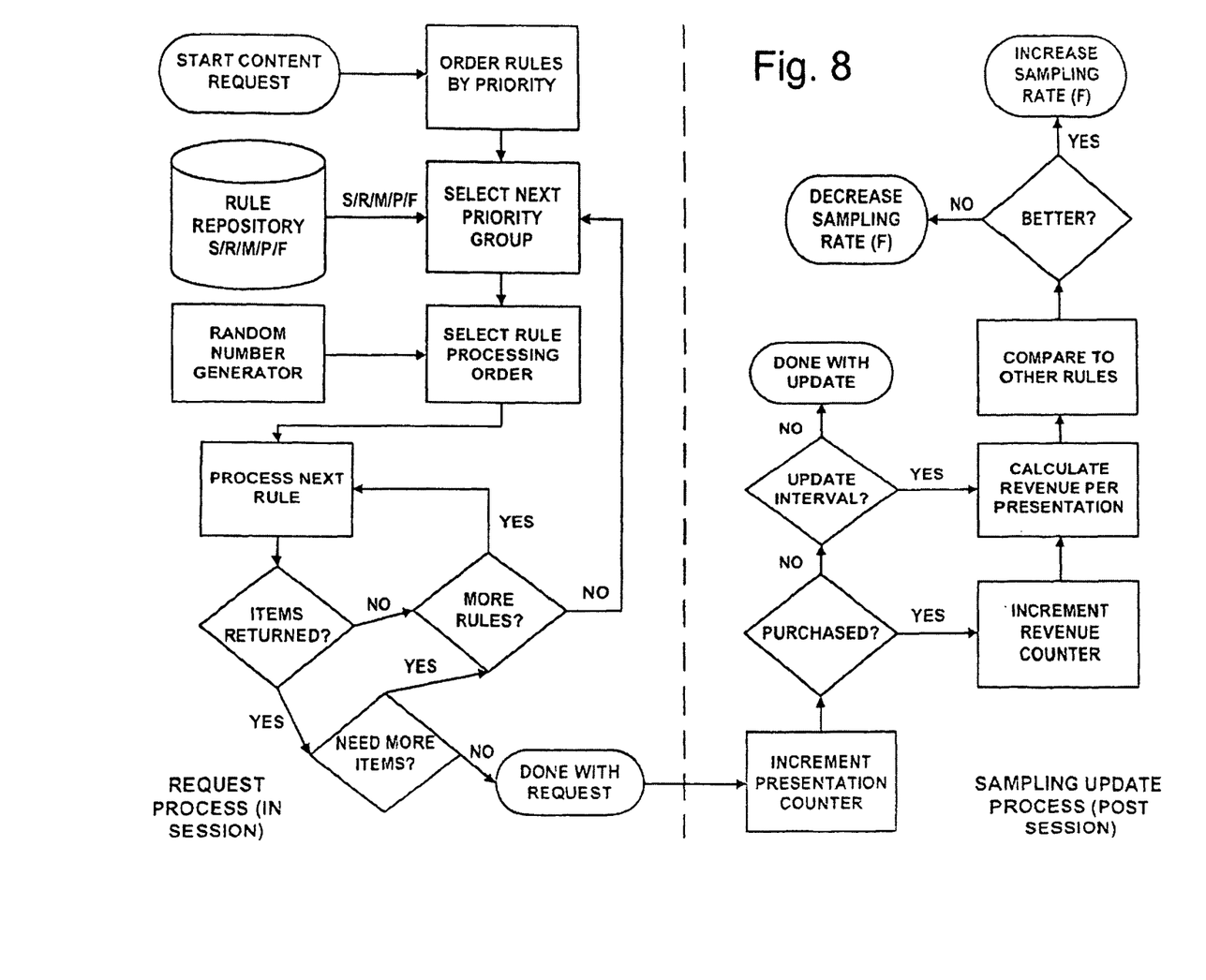
FIG. 8 shows the operation of the system to sample and select the best content recommendation strategies according to business goals.

FIG. 8 shows the operation of the system to sample and select the best content recommendation strategies according to business goals. In particular the figure shows the application to determining the most effective rules for a particular scheme, but the process can also be applied to determining the most effective recommendation methods within the scheme and rule as well. There may be multiple rules per scheme. Rules may also be grouped by priority. Rules are randomly selected within a priority group, and if the number of items requested cannot be satisfied within a priority group, then the system moves to the next priority group to fulfill the request. The selection of a rule within a priority group is according to a Monte Carlo process: Each scheme, rule, and method (S/R/M) combination is assigned a priority group $\{P=1, 2, 3, \text{etc.}\}$ and a frequency $\{F=0-1\}$. The frequencies are normalized such that the sum of the frequencies for a specific scheme and priority group (SIP) is 1.0. To select the specific R/M combination, a random number, $z$, is generated between 0 and 1 and compared to a set of intervals created by concatenating the frequencies together. Thus, if $z \leq F(RM1)$, then rule RM1 is selected; if $F(RM1) < z \leq [F(RM1)+F(RM2)]$, then rule RM2 is selected; if $[F(RM1)+F(RM2)] < z \leq [F(RM1)+F(RM2)+F(RM3)]$, then rule RM3 is selected; and so on. Once the rule is selected, the rule is processed to see if it returns any items. If the rule is not satisfied, then the system repeats the random selection process with the remaining rules in that priority group. If there are no more rules within that priority group, then the system continues to the next priority group. Once all of the rule processing has been completed, then the set of recommended content items is returned to the requesting application. If the requested number of content items is still not fulfilled after processing all of the priority groups, then, depending on the configuration of the system, either a default rule, such as most popular or best sellers, is used to complete the request or a partial, or even empty, set of recommendations is returned to the requesting application.

Once the session is completed and the outcome of the recommended items, either conversion or no conversion, is known, then the rule selection frequencies are updated as follows: First, the system processes the session and updates the S/R/M presentation, clickthrough, and revenue contribution counters. If a purchase has been made or the system is at a regular update interval, typically a daily update, then the system calculates the revenue per presentation for each S/R/M. Each rule is compared to the other rules. If the rule performs better, then its sampling rate, F, is increased; if the rule performs worse, then the sampling rate is decreased. According to this process, the rates will be updated until the system reaches equilibrium. The system may also be configured so that there are minimum or maximum sampling frequencies for each S/R/M. This may be done, for example, to ensure that a rule gets enough sampling for testing or benchmarking purposes.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact require knowledge of the specific parameters of the rules, weighting factors for promotional biases, or specific knowledge of which rules will produce the best results for a particular application, as these will be determined by the system itself in the course of measuring and optimizing cach strategy.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. An electronic system for generating personalized content for a website, the electronic system comprising:
    a data collection unit coupled to a website, the data collection unit executing software instructions to collect from the website behavioral data during an online session, wherein the behavioral data comprises information associated with a user, an item identifier, and a type of a webpage of the website;
    a service engine configured to generate the personalized content for a recommendation box of the website, service engine comprising:
        a profiling unit configured to:
            receive behavioral data from the data collection unit; and
            extract subject and object characteristics, represented in vector form as subject vectors and object vectors, respectively, from the behavioral data, represented as actual affinities of subjects to objects;
        a recommendation unit configured to provide the personalized content based at least in part on said subject and object characteristics, the recommendation unit generating the personalized content by:
            generating a list of recommendations based at least in part on predicted affinities generated by matching one or more subject vectors to one or more object vectors to generate numerical affinity scores;
            determining a different numerical bias for at least some different ones of the numerical affinity scores of the list of recommendations based at least in part on attributes or metadata defined in an application content catalog and a first set of business objectives;
            adding the determined numerical biases to the associated numerical affinity scores;
            generating a ranked list of recommendations based at least in part on the sums of the numerical biases and the numerical affinity scores;
            accessing business rules comprising a set of strategies, wherein the set of strategies corresponds to one or more recommendations in the recommendation box, and wherein the set of strategies is chosen based at least in part on the user's response to the personalized content in the recommendation box and a second set of business objectives; and
            generating a filtered ranked list of recommendations by eliminating some members of the ranked list of recommendations based at least in part on one or more of the business rules, wherein the filtered ranked list comprises one or more recommendations that meet the business rules;
        a targeted content generator configured to:
            access the filtered ranked list and display information from a catalog; and
            generate the personalized content in a data format using the filtered ranked list and display information, wherein the personalized content is configured to be communicated to the recommendation box;
        a display transformation unit configured to:
            receive the personalized content in the data format from the target content generator;
            determine a display format associated with the recommendation box;
            in response to determining the display format is different from the data format, convert the data format to the display format and communicate to the recommendation box the personalized content in the converted data format;
            in response to determining the display format is same as the data format, communicate to the recommendation box the personalized content in the data format;
        a sampling unit configured to:
            receive a conversion response of the user to the personalized content of the recommendation box;
            update the set of strategies based on one or more sampling frequencies wherein each sampling frequency corresponds to one or more strategies within the set of strategies, and wherein the sampling frequencies are determined based at least in part on the conversion response of the user; and
        an attribution unit configured to:
            measure the conversion response of the user to the personalized content of the recommendation box;
            update the sampling frequency of a strategy based at least in part on the conversion response, wherein a sampling frequency of a strategy associated with a content is increased where the personalized content receives greater conversion, and the sampling frequency is decreased where the personalized content receives a lesser conversion;
    wherein said profiling unit is further configured to:
        generate the subject vectors and the object vectors by producing initial subject vectors and initial object vectors having respective initial dimensions;

determine the predicted affinities based on the initial subject vectors, initial object vectors, and the actual affinities;

calculate a cost function; and iteratively increase the dimensions of the generated subject vectors and object vectors, and recalculate the cost function based at least in part on differences between the predicted affinities and actual affinities, until the cost function decreases to a predetermined value.

2. The electronic system of claim 1, wherein the list of recommendations is generated according to one or more recommendation methods, comprising: personalized subject recommendations, subject-object profile vector matching, object-object profile vector matching, object-object co-occurrence, including one or more of weighted co-occurrence, co-purchased, co-browsed, browsed then purchased, and other object-object co-occurrence methods, and single object methods, including but not limited to most viewed, most purchased, most viewed recommendations, most purchased recommendations, or other single object method.

3. The electronic system of claim 2, wherein the list of recommendation is further generated based on both current and prior actions, the current and prior actions comprising actions associated with product, category, search term, brand, content, or other application context.

4. The electronic system of claim 1, wherein business objectives included in the first set or the second set of business objectives are based on one or more of revenue, margin, inventory, new items, or featured promotional items.

5. The electronic system of claim 1, wherein the first set of business objectives and the second set of business objectives comprise the same metadata.

6. The electronic system of claim 1, wherein the service engine further comprises a merchandiser user interface for defining and testing business rules.

7. The electronic system of claim 1, wherein the recommendation unit is further configured to generate the personalized content by providing one or more of the following: assignment of attribution of user response to recommendations, performance monitoring, recommendation strategy sampling, or optimization of a strategy.

8. The electronic system of claim 7, wherein the optimization includes sampling different rules and methods for the set of strategies and automatically adjusting sampling rates and rule, promotion, or recommendation method parameters to maximize performance against a defined performance goal for the personalized content.

9. The electronic system of claim 1, wherein said attributes or metadata are based on merchandising knowledge of an application expert or a desired influence on said user.

10. The electronic system of claim 1, wherein said recommendation unit is further configured to provide recommended content by processing a sequence of strategies, wherein said sampling module selects the said sequence of business strategies from a set of sequences of business strategies.

11. An electronic method for generating personalized content for a website, the electronic method comprising the steps of:

under control of one or more hardware processors, wherein the hardware processors are configured to execute software instructions comprising:

collecting from the website behavioral data that comprise visitor behavior and behavioral context during a session, wherein the website comprises a recommendation box for the personalized content;

extracting subject and object characteristics, represented in vector form as subject vectors and object vectors, respectively, from said behavioral data, represented as actual affinities of subjects to objects;

generating a list of recommendations based at least in part on numerical predicted affinities generated by matching one or more subject vectors to one or more object vectors;

determining a different numerical bias for at least some different ones of the numerical predicted affinities of the list of recommendations based at least in part on attributes or metadata defined in an application content catalog and a first set of business objectives;

adding the determined numerical biases to the associated numerical predicted affinities;

generating a ranked list of recommendations based at least in part on the sums of the numerical biases and the numerical predicted affinities;

accessing business rules comprising a set of strategies, wherein the set of strategies corresponds to one or more recommendations in the recommendation box, and wherein the set of strategies is chosen based at least in part on the user's response to the personalized content in the recommendation box and a second set of business objectives;

generating a filtered ranked list of recommendations by eliminating some members of the ranked list of recommendations based at least in part on one or more of the business rules, wherein the filtered ranked list comprises one or more recommendations that meet the business rules;

generating the personalized content in a data format using the filtered ranked list and display information associated with the recommendations on the filtered ranked list;

determining a display format associated with the recommendation box;

in response to determining the display format is different from the data format, convert the data format to the display format and communicate to the recommendation box the personalized content in the converted data format;

in response to determining the display format is same as the data format, communicate to the recommendation box the personalized content in the data format;

measuring a conversion response of the user to the personalized content of the recommendation box;

updating one or more sampling frequencies based at least in part on the conversion responses, wherein the one or more sampling frequencies are increased where the personalized content has greater conversion and are decreased where the personalized content has lesser conversion;

updating the set of strategies based on the one or more sampling frequencies wherein each sampling frequency corresponds to one or more strategies within the set of strategies;

generating the subject vectors and the object vectors by producing initial subject vectors and initial object vectors having respective initial dimensions;

determining the predicted affinities based on the initial subject vectors, initial object vectors, and the actual affinities;

calculating a cost function; and iteratively increasing the dimensions of the generated subject vectors and object vectors; and recalculating the cost function based on the differences between the predicted affinities and actual affinities, until the cost function decreases to a predetermined value.

12. The electronic method of claim 11 wherein generating a list of recommendations based at least in part on predicted affinities generated by matching subject vectors to object vectors is performed by generating the list of recommendations using at least one of the following recommendation methods: personalized subject recommendations, subject-object profile vector matching, object-object vector profile matching, object-object co-occurrence, including one or more of weighted co-occurrence, co-purchased, co-browsed, browsed then purchased, and other object-object co-occurrence methods, and single object methods, including but not limited to most viewed, most purchased, most viewed recommendations, most purchased recommendations, or other single object method.

13. The electronic method of claim 11 wherein the list of recommendation is further generated based on both current and prior actions, the current and prior actions comprising actions associated with product, category, search term, brand, content, or other application context.

14. The electronic method of claim 11, wherein business objectives included in the first set or the second set of business objects are based on one or more of revenue, margin, inventory, new items, or featured promotional items.

15. The electronic method of claim 11, the first set of business objectives and the second set of business objectives comprise the same metadata.

16. The electronic method of claim 11, further comprising generating the personalized content by providing one or more of the following: assignment of attribution of user response to recommendations, performance monitoring, recommendation strategy sampling, or optimization of a strategy.

17. The electronic method of claim 16, wherein the optimization includes
sampling different rules and methods for the set of strategies and automatically adjusting
sampling rates and rule, promotion, and recommendation method parameters to maximize performance against a defined performance goal for the application.

18. The electronic method of claim 11, further comprising steps of:
obtaining said user's application history and vector profile;
obtaining said user's current application context;
submitting said application history, vector profile;
generating profiled recommendation scores by matching user profile vector and object profile vectors of potential recommended content;
generating promotion scores according to attributes or metadata defined in an application content catalog;
combining the list of recommendations and promotions scores;
filtering top-ranked objects through the business rules; and
communicate filtered top-ranked objects as recommendations to said user through said recommendation box.

19. The electronic method of claim 18, wherein said step of communicate the filtered top-ranked objects as recommendations to the user within the application includes the step of returning the filtered top-ranked objects as recommendations to the user within a web store.

* * * * *